(12) United States Patent
Cambou

(10) Patent No.: US 9,543,014 B2
(45) Date of Patent: Jan. 10, 2017

(54) MEMORY CIRCUITS USING A BLOCKING STATE

(71) Applicant: Bertrand F. Cambou, Flagstaff, AZ (US)

(72) Inventor: Bertrand F. Cambou, Flagstaff, AZ (US)

(73) Assignee: Bertrand F. Cambou, Flagstaff, AZ (US)

( * ) Notice: Subject to any disclaimer, the term of this patent is extended or adjusted under 35 U.S.C. 154(b) by 0 days.

(21) Appl. No.: 14/748,922

(22) Filed: Jun. 24, 2015

(65) Prior Publication Data
US 2016/0307628 A1    Oct. 20, 2016

Related U.S. Application Data

(60) Provisional application No. 62/147,244, filed on Apr. 14, 2015.

(51) Int. Cl.
| | | |
|---|---|---|
| *G11C 15/04* | (2006.01) | |
| *G11C 16/04* | (2006.01) | |
| *G11C 16/10* | (2006.01) | |

(52) U.S. Cl.
CPC ......... *G11C 15/046* (2013.01); *G11C 16/0483* (2013.01); *G11C 16/10* (2013.01)

(58) Field of Classification Search
CPC ...................................................... G11C 5/00
USPC ......................................................... 365/49
See application file for complete search history.

(56) References Cited

U.S. PATENT DOCUMENTS

| | | |
|---|---|---|
| 4,532,438 A | 7/1985 | Reiner |
| 4,899,154 A | 2/1990 | Colles |
| 5,500,601 A | 3/1996 | Lisart et al. |
| 5,589,785 A | 12/1996 | Garavan |
| 6,317,349 B1 | 11/2001 | Wong |
| 6,331,961 B1 | 12/2001 | Kengeri et al. |
| 6,370,061 B1 | 4/2002 | Yachareni et al. |
| 6,430,073 B1 | 8/2002 | Batson et al. |

(Continued)

FOREIGN PATENT DOCUMENTS

| | | | |
|---|---|---|---|
| WO | WO 03088256 A1 * | 10/2003 | ............. G11C 15/00 |
| WO | WO-03088256 A1 | 10/2003 | |
| WO | WO2006043237 | 4/2006 | |

OTHER PUBLICATIONS

International Search Report & Written Opinion, Application No. PCT/US2015/037402 Applicant, Cambou, Bertrand F., Mailed Sep. 16, 2015, 9 pages.

(Continued)

*Primary Examiner* — Anthan Tran
(74) *Attorney, Agent, or Firm* — Barclay Damon, LLP

(57) ABSTRACT

A memory circuit with blocking states. In one embodiment, the memory circuit includes a two non-volatile transistors connected in series. The input state of the memory cell and the stored state of the memory cell are configured to be a plurality of states including a zero state, a one state, a no care state, and an input blocking state. When the input state of the memory cell is the blocking state, the memory cell is configured to be in a blocking mode unless the stored state of the memory cell is the no care state. When the stored state of the memory cell is the blocking state, the memory cell is configured to be in the blocking mode unless the input state of the memory cell is the no care state.

17 Claims, 5 Drawing Sheets

(56) References Cited

U.S. PATENT DOCUMENTS

| | | |
|---|---|---|
| 6,498,751 B2 | 12/2002 | Ordonez et al. |
| 6,542,409 B2 | 4/2003 | Yamada |
| 6,873,551 B2 | 3/2005 | Bedarida et al. |
| 7,016,211 B2 | 3/2006 | Park et al. |
| 7,082,056 B2 | 7/2006 | Chen et al. |
| 7,085,155 B2 | 8/2006 | Ovshinsky et al. |
| 7,088,603 B2 | 8/2006 | Patel |
| 7,110,275 B2 | 9/2006 | Park |
| 7,307,860 B2 | 12/2007 | Hu |
| 7,342,832 B2 | 3/2008 | Lee et al. |
| 7,436,698 B2 | 10/2008 | Lin et al. |
| 7,483,305 B2 | 1/2009 | Yamada |
| 7,486,530 B2 | 2/2009 | Hartono et al. |
| 7,508,022 B2 | 3/2009 | Amo et al. |
| 7,518,897 B2 | 4/2009 | Nozieres et al. |
| 8,089,793 B1 | 1/2012 | Gharia |
| 8,228,703 B2 | 7/2012 | Javerliac et al. |
| 8,513,791 B2 | 8/2013 | Bucki et al. |
| 8,576,599 B2 | 11/2013 | Atwal et al. |
| 8,634,247 B1 | 1/2014 | Sprouse et al. |
| 8,717,794 B2 | 5/2014 | Cambou et al. |
| 8,749,361 B2 | 6/2014 | Najafi et al. |
| 8,780,633 B2 | 7/2014 | Sprouse et al. |
| 8,817,541 B2 | 8/2014 | Li et al. |
| 2008/0249947 A1 | 10/2008 | Potter |
| 2009/0190404 A1 | 7/2009 | Roohparvar |
| 2010/0235900 A1 | 9/2010 | Robinton et al. |
| 2011/0249480 A1 | 10/2011 | Cho |
| 2012/0143554 A1 | 6/2012 | Cambou et al. |
| 2012/0272307 A1 | 10/2012 | Buer |
| 2013/0013931 A1 | 1/2013 | O'Hare et al. |
| 2014/0185349 A1 | 7/2014 | Terzioglu et al. |
| 2014/0347933 A1* | 11/2014 | Lee .................. G11C 15/046 365/185.17 |
| 2015/0163056 A1 | 6/2015 | Nix |

OTHER PUBLICATIONS

International Search Report & Written Opinion, Application No. PCT/US2015/040731, Applicant, Cambou Bertrand F., Mailed Oct. 6, 2015, 11 pages.

Content-Addressable Memory (CAM) Circuits and Architectures: A Tutorial and Survey by Kostas Pagiamtzis, and Ali Sheikholeslami, IEEE Journal of Solid-State Circuits, vol. 41, No. 3, Mar. 2006, 16 pages.

U. S. Patent and Trademark Office (IPEA/US), International Preliminary Report on Patentability from PCT/US2015/037402, dated Apr. 22, 2016 (5 pgs.).

* cited by examiner

| BLCAM v1 Input \ Stored | Matching? | | |
|---|---|---|---|
| | "0" | "1" | "BX" |
| "0" | Yes | No | Yes |
| "1" | No | Yes | Yes |
| "BB" | No | No | Yes |

FIG. 2A

| BLCAM v2 Input \ Stored | Matching? | | |
|---|---|---|---|
| | "0" | "1" | "BB" |
| "0" | Yes | No | No |
| "1" | No | Yes | No |
| "BX" | Yes | Yes | Yes |

FIG. 2B

| BLTCAM Input \ Stored | Matching? | | | |
|---|---|---|---|---|
| | "0" | "1" | "BX" | "BB" |
| "0" | Yes | No | Yes | No |
| "1" | No | Yes | Yes | No |
| "BX" | Yes | Yes | Yes | Yes |
| "BB" | No | No | Yes | No |

FIG. 2C

| CAM Input \ Stored | Matching? | |
|---|---|---|
| | "0" | "1" |
| "0" | Yes | No |
| "1" | No | Yes |

FIG. 1A
(PRIOR ART)

| TCAM Input \ Stored | Matching? | | |
|---|---|---|---|
| | "0" | "1" | "BX" |
| "0" | Yes | No | Yes |
| "1" | No | Yes | Yes |
| "BX" | Yes | Yes | Yes |

FIG. 1B
(PRIOR ART)

| | "f0" is programmed<br>Vt0 Low | "f1" is programmed<br>Vt1 high |
|---|---|---|
| Input "f0" | Vg0>Vt0   Rds0 Low | Vg0<Vt1   Rds0 High |
| Input "f1" | Vg1>Vt0   Rds1 Low | Vg1>Vt1   Rds1 Low |
| | 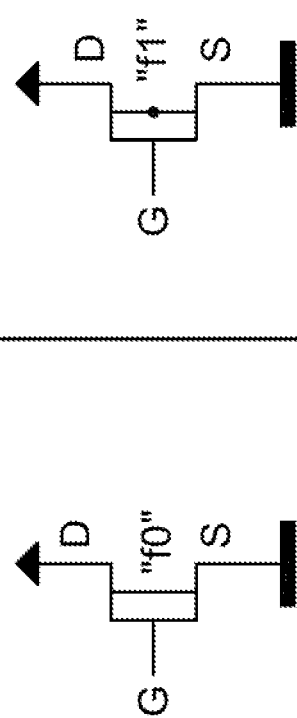 | 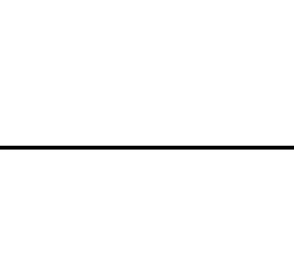 |
| | Typ. Rds Low=1kΩ<br>Typ. Rds high=1MΩ | |
FIG. 3

MEMORY CIRCUITS USING A BLOCKING STATE

CROSS-REFERENCE TO RELATED APPLICATIONS

This application claims the benefit of and priority to U.S. Provisional Patent Application Ser. No. 62/147,244, filed Apr. 14, 2015, and entitled "Content Addressable Memory (BCAM) with Blocking States and Combination of Multiple Secure Authentication Methods," the entirety of which is incorporated herein by reference.

BACKGROUND OF THE INVENTION

The subject matter disclosed herein relates to memory, and more particularly to the use of a memory circuit to compare input data against stored data using a blocking state.

Many different types of memory circuits can be used to compare input data (e.g., an input pattern or search data) against stored data (e.g., reference pattern(s) or a table of stored data). One example of such a memory circuit is Content Addressable Memory (CAM). When a CAM determines a match between the input data and the stored data, it returns the address(es) of the matching data. CAMs, which can perform the comparison between the input data and all of its stored data in a single clock cycle, can be used in a variety of applications requiring high speeds, including packet classification and packet forwarding in network routers.

One type of CAM, known as a Binary CAM (BCAM), uses binary data consisting entirely of two states (0s and 1s) for comparing input data to stored data as shown in the exemplary BCAM truth table of FIG. 1A. The BCAM truth table (FIG. 1A) is of an XOR gate (Exclusive OR), wherein the output is "yes" for a match only if both the input state and the stored state are the same. Conversely, the output is a "no" for a mismatch if the input state does not match the stored state.

A Ternary CAM (TCAM) uses data consisting of 0s and 1s as well as a third state known as a "no care" state (or "BX" state) as shown in the exemplary TCAM truth table of FIG. 1B. The TCAM truth table (FIG. 1B) is also of an XOR gate (Exclusive OR), wherein the output is "yes" for a match only if (a) the input state and the stored state are the same, (b) the stored state is a "no care" state (BX) regardless of the input state (0, 1, or BX), or (c) the input state is a "no care" state (BX) regardless of the stored state (0, 1, or BX). Conversely, the output is a "no" for a mismatch if the input state does not match the stored state, except in the case where the input state or the stored state is a "no care" state (BX). In many cases, the input data is a stream of several bits, where each input bit must be compared to a stored bit in a CAM cell to determine if all of the bits match to provide a "yes" output.

Most CAMs are built with static random access memory (SRAM) cells, where a typical CAM consists of two SRAM cells. In the past, a few 2/4T (2 transistors) Flash Negative-AND (NAND) based architectures have been employed for CAMs (e.g., U.S. Pat. Nos. 6,317,349, 7,110,275, 8,634, 247). Recently, the concept of a 4T (four transistors) cell was also presented (e.g., U.S. Patent Application Publication No. 2014/0185349 A1). BCAMs and TCAMs have also been reported to be used for searches and, in cryptography, to safely compare input authentication patterns with reference patterns stored in the CAM (e.g., U.S. Pat. Nos. 8,780,633, 8,817,541, 8,717,794, and U.S. Patent Application Publication No. 2012/0143554).

The discussion above is merely provided for general background information and is not intended to be used as an aid in determining the scope of the claimed subject matter.

BRIEF DESCRIPTION OF THE INVENTION

A memory circuit with blocking states is disclosed. A memory circuit with blocking states. In one embodiment, the memory circuit includes a two non-volatile transistors connected in series. The input state of the memory cell and the stored state of the memory cell are configured to be a plurality of states including a zero state, a one state, a no care state, and an input blocking state. When the input state of the memory cell is the blocking state, the memory cell is configured to be in a blocking mode unless the stored state of the memory cell is the no care state. When the stored state of the memory cell is the blocking state, the memory cell is configured to be in the blocking mode unless the input state of the memory cell is the no care state.

In one embodiment, the memory circuit includes a memory cell, wherein the memory cell includes a first non-volatile transistor having a first control gate connected to a first bit line, and a second non-volatile transistor having a second control gate connected to a second bit line. Each of the first non-volatile transistor and the second non-volatile transistor is configured to be programmed in a first transistor state (e.g., zero) or a second transistor state (e.g., one). The first non-volatile transistor is connected in series with the second non-volatile transistor. The input state of the memory cell is defined by a first bit on the first bit line and a second bit on the second bit line and is configured to be a plurality of states including an input zero state, an input one state, an input no care state, and an input blocking state. The stored state of the memory cell is defined by the transistor states of the first non-volatile transistor and the second non-volatile transistor and is configured to be a plurality of states including a stored zero state, a stored one state, a stored no care state, and a stored blocking state. When the input state of the memory cell is the input blocking state, the memory cell is configured to be in a blocking mode unless the stored state of the memory cell is the stored no care state. When the stored state of the memory cell is the stored blocking state, the memory cell is configured to be in the blocking mode unless the input state of the memory cell is the input no care state.

In another embodiment, the input state is configured to be a plurality of states including an input zero state, an input one state, and an input blocking state. The stored state of the memory cell is configured to be a plurality of states including a stored zero state, a stored one state, and a stored no care state. When the input state of the memory cell is the input blocking state, the memory cell is configured to be in a blocking mode unless the stored state of the memory cell is a stored no care state.

In yet another embodiment, the input state of the memory cell is configured to be a plurality of states including an input zero state, and input one state, and an input no care state. The stored state of the memory cell is configured to be a plurality of states including a stored zero state, a stored one state, and a stored blocking state. When the stored state of the memory cell is a stored blocking state, the memory cell is configured to be in a blocking mode unless the input state of the memory cell is the input no care state.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of invention. Thus, for further understanding of the invention, reference can be made to the following detailed description, read in connection with the drawings in which:

FIGS. 1A and 1B are illustrations of exemplary truth tables for BCAMs and BTCAMs;

FIGS. 2A and 2B are illustrations of exemplary truth tables for two embodiments of BLCAMs;

FIG. 2C is an illustration of an exemplary truth table for BLTCAMs;

FIG. 3 is an illustration of an exemplary NAND Flash-type transistor of a BLCAM/BLTCAM;

DETAILED DESCRIPTION OF THE INVENTION

Figure 4:
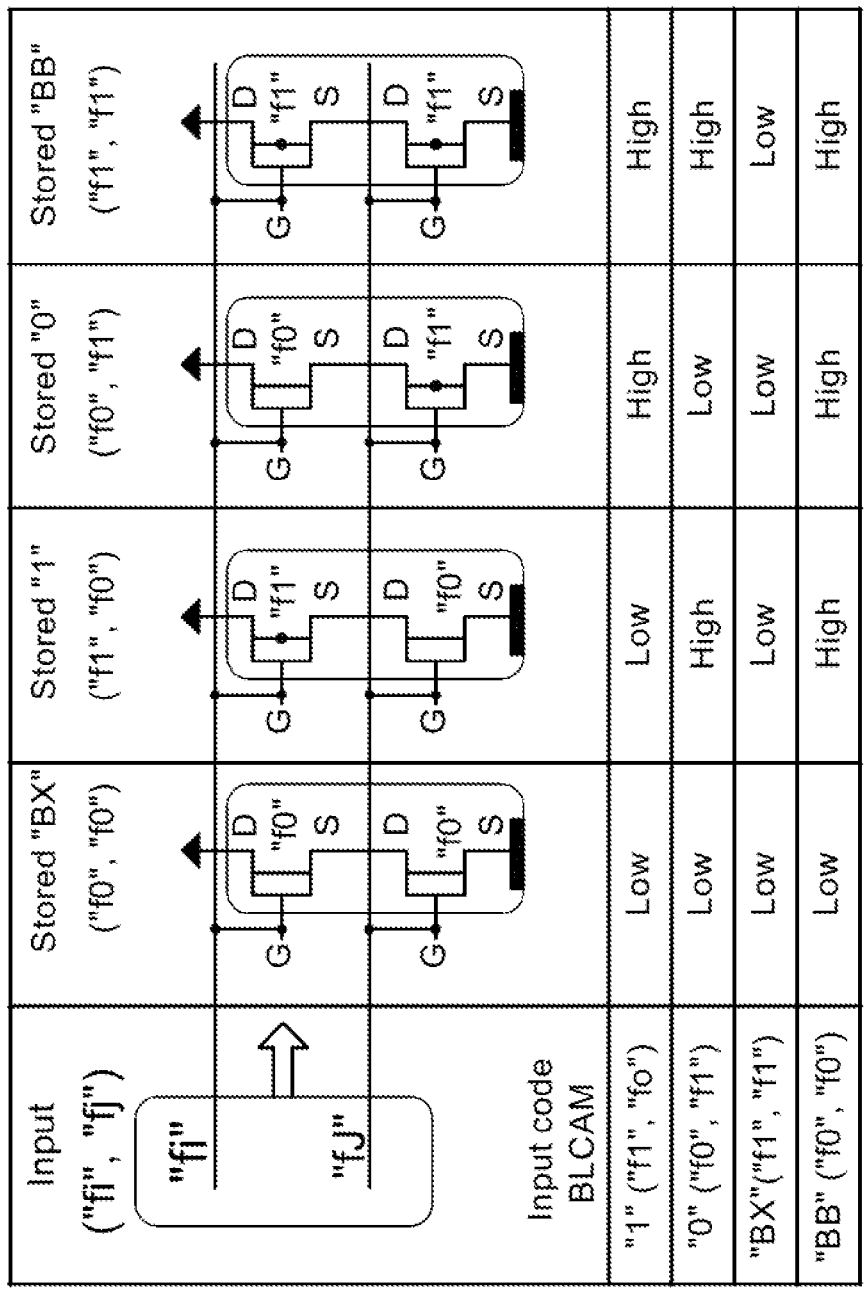
FIG. 4 is a table illustrating the impedance of an exemplary BLCAM/BLTCAM.

In accordance with one embodiment of the invention involving the use of a memory circuit to compare input data against stored data using blocking states (e.g., for user authentication), exemplary non-volatile NAND Flash-type CAM circuits are disclosed. However, it will be understood that other types of memory circuits and manufacturing technologies other than CAM circuits (or NAND Flash-type CAM circuits) can be used to implement the use of blocking states, including NOR Flash, EEPROM, and One-Time Programmable (OTP).

FIGS. 2A and 2B are illustrations of exemplary truth tables for two embodiments of Blocking Content Addressable Memory (BLCAM) circuits. FIG. 2C is an illustration of an exemplary truth table for an embodiment of a Blocking Ternary Content Addressable Memory (BLTCAM) circuit. In addition to the binary states (0s and 1s) and "no care" state (BX), these exemplary truth tables also incorporate a "blocking" state (BB).

The exemplary BLCAM truth tables of FIGS. 2A and 2B superimpose the BCAM truth table shown in FIG. 1A, but with the additional "no care" (BX) and "blocking" (BB) states. In the first exemplary version (v1) of the BLCAM truth table shown in FIG. 2A, the output is "yes" for a match only if (a) the input state and the stored state are the same, or (b) the stored state is a "no care" state (BX) regardless of the input state (0, 1, or BB). Conversely, the output is a "no" for a mismatch if (a) the input state does not match the stored state except in the case where the stored state is a "no care" state (BX), or (b) the input state is a "blocking" state (BB) except in the case where the stored state is a "no care" state (BX). In other words and with respect to situation when the input state is a "blocking" state (BB), the output is a "no" for a mismatch when the stored state is a 0 or a 1.

In the second exemplary version (v2) of the BLCAM truth table shown in FIG. 2B, the output is "yes" for a match only if (a) the input state and the stored state are the same, or (b) the input state is a "no care" state (BX) regardless of the stored state (0, 1, or BB). Conversely, the output is a "no" for a mismatch if (a) the input state does not match the stored state except in the case where the input state is a "no care" state (BX), or (b) the stored state is a "blocking" state (BB) except in the case where the input state is a "no care" state (BX). In other words and with respect to situation when the stored state is a "blocking" state (BB), the output is a "no" for a mismatch when the input state is a 0 or a 1.

The exemplary BLTCAM truth table of FIG. 2C superimposes the TCAM truth table shown in FIG. 1B, but with the additional "blocking" state (BB) at the input and stored stages such that the input and stored stages can have four possible states (0, 1, BX, and BB) using two bit lines. In the exemplary BLTCAM truth table shown in FIG. 2C, the output is "yes" for a match only if (a) the input state and the stored state are the same except if the input state and the stored state are both "blocking" states (BB), or (b) the input state is a "no care" state (BX) regardless of the stored state (0, 1, BX, or BB). Conversely, the output is a "no" for a mismatch if (a) the input state does not match the stored state except in the case where the input state or the stored state is a "no care" state (BX), or (b) the input state or the stored state is a "blocking" state (BB) except in the case where the input state or the stored state is a "no care" state (BX).

As will be discussed, when the output is "yes" for a match, the of the BLCAM/BLTCAM is configured to be in a passing (or conductive) mode (low impedance). But when the output is a "no" for a mismatch, the BLCAM/BLTCAM is configured to be in a blocking (or non-conductive) mode (high impedance).

As can be seen from the truth tables of FIGS. 2A, 2B, and 2C, the 0 and 1 states are symmetrical as they play an opposite role to each other. However, the "no care" state (BX) and the "blocking" state (BB) are asymmetrical, since the output is "yes" for a match when the input state and the stored state are both "no care" states (BX), but the output is a "no" for a mismatch when the input state and the stored state are both "blocking" states (BB). This asymmetry can be employed as a feature to increase security.

FIG. 3 is an illustration of an exemplary non-volatile NAND Flash-type transistor for use in a BLCAM/BLTCAM circuit. It will be understood that while NAND Flash-type transistors are used in the exemplary embodiment, alternative embodiments of the invention can use any type of non-volatile memory transistors having a control gate (G), a source terminal (S), and a drain terminal (D) available for connection as shown in FIG. 3.

The Exemplary BLCAM/BLTCAM cell is based on two non-volatile NAND Flash-type transistors that are connected as described below. To avoid confusion between the depiction of the BLCAM/BLTCAM cells and the underlying NAND Flash-type transistor, the stored 0 (zero) and 1 (one) states of the NAND Flash-type transistor are referred to as "f0" (first) and "f1" (second) transistor states. The read mode and programming mode of the underlying NAND Flash-type transistors as integrated in BLCAM/BLTCAMs are described in FIG. 3. The threshold voltage (Vt0) when the programming is in an "f0" transistor state, is such that the NAND Flash-type transistor is in a passing mode (low impedance and conductive between the drain and the source in the NAND Flash-type transistor) both when the input state is at a low voltage level (Vg0), as well as at a high voltage input level (Vg1). When the programming is in an "f1" transistor state, the NAND Flash-type transistor is in a passing (or conductive) mode when the input state is at a high voltage level (Vg1), and in a blocking mode (high impedance and not conductive between the drain and the source in the NAND Flash-type transistor) when the input state is at a low voltage level (Vg0). In an example, the output impedance of the NAND Flash-type transistor is in the low impedance range (e.g., 100Ω to 1 KΩ) in the passing (or conductive) mode. In another example, the output impedance of the NAND Flash-type transistor is in the high impedance range (1 MΩ or higher) in the blocking mode. Typical input voltages on the control gate of the NAND Flash-type transistor could be approximately 0.8V for Vg0, and approximately 1.8V for Vg1. Since this voltage could vary from one process technology to another, the Vg0 voltage can be set in such a way that a NAND Flash-type transistor programmed in a 0 state ("f0") will enable a passing mode of the NAND Flash-type transistor, while the transistor programmed in a 1 state ("f1") will result in a blocked NAND Flash-type transistor. Vg1 voltage should be high enough to enable a passing mode of the NAND Flash-type transistor with "f0" and "f1" states. Such transistor structures are also available with NOR Flash, EEPROM, and OTP, among others, and can be the foundation for the design of BLCAM/BLTCAM circuits.

FIG. 4 is a table illustrating the impedance of an exemplary BLTCAM with four BLTCAM cells. An exemplary BLTCAM cell is built out of two non-volatile NAND Flash-type transistors and has two separate bit lines ("fi" and "fj"). The first bit line ("fi") is connected to the control gate (G) of the first NAND Flash-type transistor in each BLTCAM cell, while the second bit line ("fj") is connected to the control gate (G) of the second NAND Flash-type transistor in each BLTCAM cell. The first NAND Flash-type transistor is connected in series with the second NAND Flash-type transistor, with the source of the first NAND Flash-type transistor connected in series with the drain of the second NAND Flash-type transistor. The input state is defined by a pair of bits, and has four states: "1", "0", "BX" (no care), and "BB" (blocking) It will be understood that the relationship between these states of the input stage and the state of underlying NAND Flash-type transistor described in FIG. 3, "f0" or "f1", is arbitrary and has been chosen for illustrative purposes and can be changed. In the exemplary embodiment disclosed herein, the ("f1", "f0") pair is referred to as the "1" state of the input stage of the BLTCAM, the ("f0", "f1") pair is referred to as the "0" state, the ("f1", "f1) is referred to as the "BX" (no care) state, and the ("f0", "f0") is referred to as the "BB" (blocking) state. In order to superimpose the truth table of the BLTCAM (FIG. 2C) with an existing TCAM (FIG. 1B), the arbitrary definition of the four states that the NAND Flash-type transistor can be programmed is slightly different at the storage level: the ("f1", "f1") pair is referred to as the "BB" (blocking) state, the ("f0", "f0") pair is referred to as the "BX" (no care) state, the ("f1", "f0") pair is still referred to as the "1" state, and the ("f0", "f1") pair is referred to as the "0" state. The states chosen here are just an example as the objective is to match the truth table of FIG. 2C for illustrative purposes. In summary, BLTCAMs have four distinct states, both at the input and output stages, while traditional BCAM and TCAM architectures have only 2 and 3 states, respectively. The additional blocking state of the BLTCAM can be exploited in areas including, but not limited to, cryptography.

As shown in FIG. 4, which is illustrative of the exemplary BLTCAM truth table of FIG. 2C, the exemplary BLTCAM cell is in a passing (or conductive) mode (low impedance) for a match only if (a) the input code and the stored code are the same except if the input code and the stored code are both "blocking" states (BB), or (b) the input code is a "no care" state (BX) regardless of the stored code (0, 1, BX, or BB). Conversely, the exemplary BLTCAM cell is in a blocking mode (high impedance) for a match mismatch if (a) the input code does not match the stored code except in the case where the input code or the stored code is a "no care" state (BX), or (b) the input code or the stored state is a "blocking" state (BB) except in the case where the input code or the stored code is a "no care" state (BX).

Figure 5:
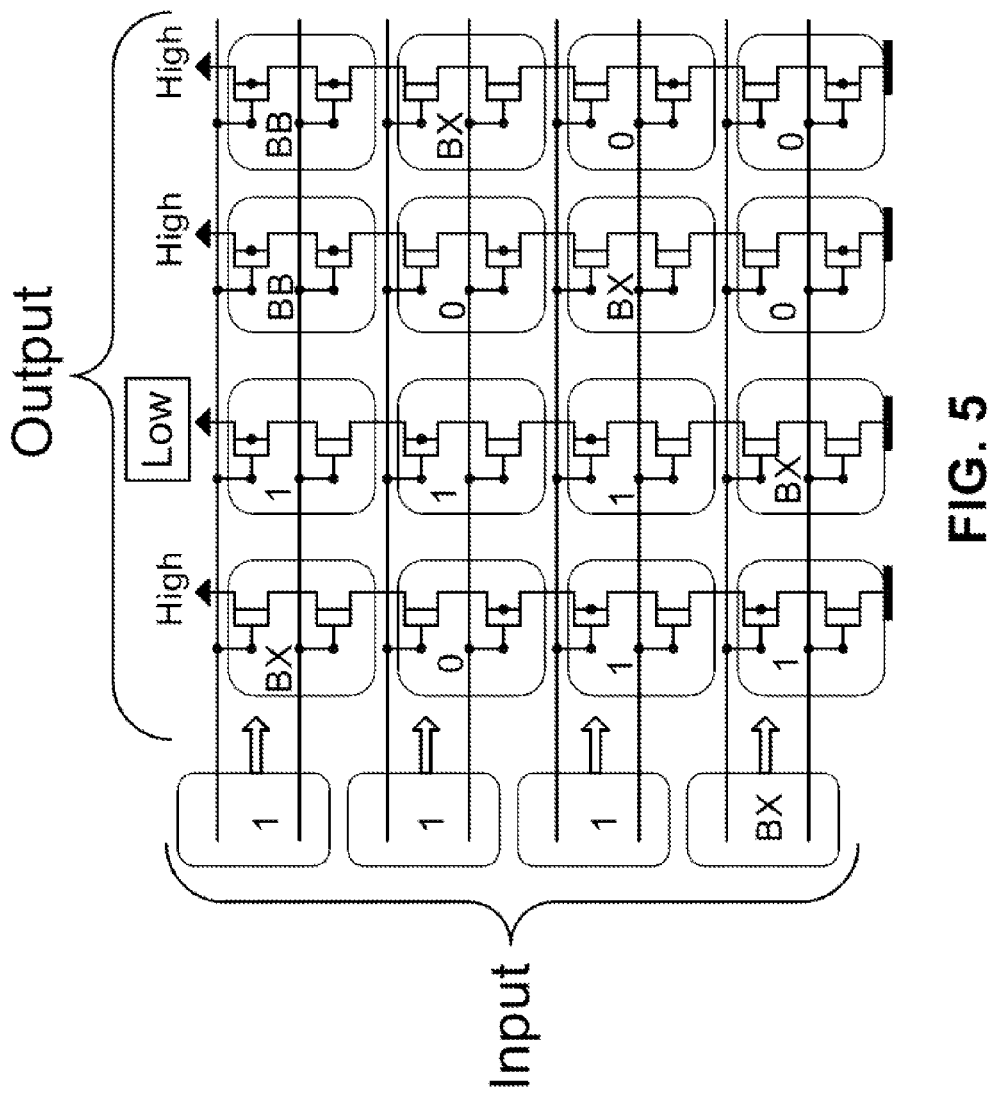
FIG. 5 is an illustration of an exemplary four-state BLCAM/BLTCAM NAND cell.

FIG. 5 is an illustration of an exemplary four-state BLTCAM circuit with an array of sixteen BLTCAM cells for a eight bit input (word or pattern) with four different stored words or patterns (one in each column). An discussed above, the exemplary BLTCAM cell is built out of two non-volatile NAND Flash-type transistors and has two separate bit lines. The first bit line is connected to the control gate of the first NAND Flash-type transistor in each BLTCAM cell, while the second bit line is connected to the control gate (G) of the second NAND Flash-type transistor in each BLTCAM cell. Multiple BLTCAM cells can be connected in series to form longer NAND chains storing strings of 0s, 1s, BXs, and BBs for the four possible states, as shown in FIG. 5. For example, in applications where cryptographic keys are stored, as much as 1 kbit chains can be stored. If only one NAND Flash-type transistor has high impedance in blocking mode, the entire chain will have a high impedance creating blocking. The NAND chain has low impedance in a passing mode when the pattern in the input stage matches the pattern stored in the chain creating a passing or conductive chain. Additional input patterns replacing a "0" or a "1" by a "BX" will also result in an output stage in a passing mode (Low impedance), as "BX" represents the "no care" state. However if a wrong state ("0" or "1") is present at the wrong location of the chain creating a mismatch, the entire chain will be in a blocking mode (high impedance). "BB" (blocking) in the input pattern will only result in a passing mode (low impedance) output if a "BX" (no care) is stored at the matching location.

As shown in FIG. 5, it is possible to design an array of multiple NAND chains sharing the same input lines, also called bit lines. In this case, is it possible to test these multiple chains concurrently. For example, these NAND chains can be arranged in parallel columns storing strings of 0s, 1s, BXs, and BBs for the four possible states. In the example illustrated in FIG. 5, only the second chain has a low output impedance (passing mode) resulting from a matching input code and the stored code, while the remaining three chains have high impedance (blocking mode) resulting from a mismatch between the input code and the stored code. Such a configuration can be widely implemented in routers, as well as look up tables with triggering dispatching capabilities.

Figure 6:
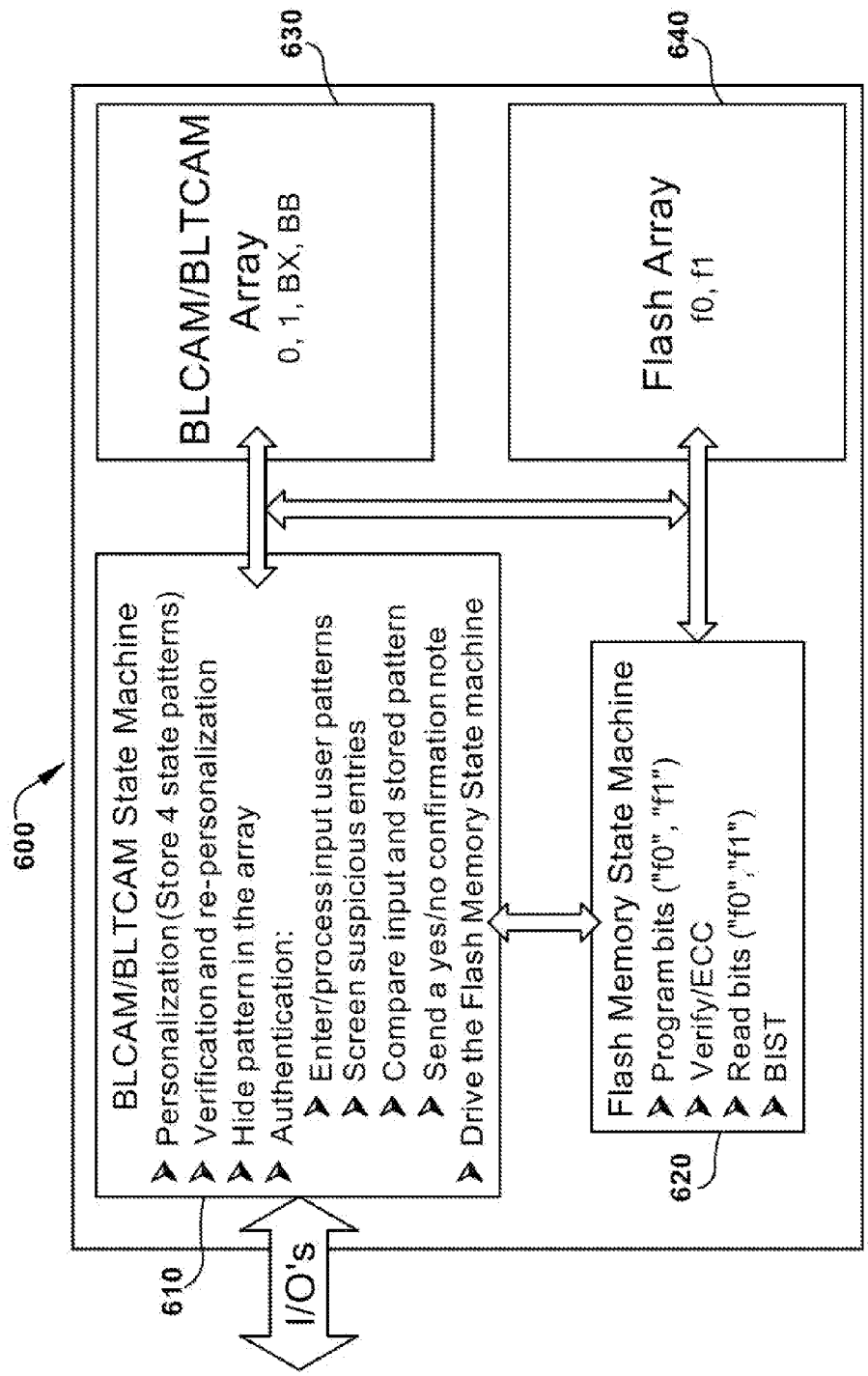
FIG. 6 is a block diagram of an exemplary BLCAM/BLTCAM state machine.

FIG. 6 is a block diagram of an exemplary state machine 600 that includes a BLCAM/BLTCAM state machine 610 and a Flash Memory state machine 620. The exemplary state machine drives basic functions of a memory device, including, but not limited to, programming the BLCAM/BLTCAM array 630 and Flash Array 640, verifying and correcting the content as needed, and reading the stored information. The exemplary state machine 600 reuses the standard blocks of a NAND flash state machine and performs additional tasks, including, but not limited to the following examples.

For example, the state machine 600 performs personalization, downloading strings of information that include "zeros", "ones", "no cares", and "blocking" states. When identity keys are downloaded in a secure memory, patterns are stored in the arrays 630, 640. The state machine 600 can be programmed to perform operations that enhance security during this cycle, including, but not limited to, burying (or hiding) the secure patterns within the arrays 630, 640, preventing hackers from easily extracting these patterns in the unlikely event that a hacker was able to read the overall content of the arrays 630, 640.

In another example, the state machine 600 performs verification and validation of the data integrity. The state machine 600 verifies the integrity of the data stored in memory, test its reliability, and, if necessary, reprograms and corrects the content. If part of the arrays 630, 640 has defects, the state machine 600 can find the portion of the arrays 630, 640 suitable for the download or send a message back to the operator that part of the arrays 630, 640 is defective. Such operations are sometimes referred as Build In Self-Test (BIST).

Further, the state machine 600 performs authentication. The state machine 600 verifies that strings of information were correctly downloaded and corrects the strings as necessary or sends a message to reject a part of the strings that is defective. These actions can be performed without reading and exposing the strings stored in the BLCAM/BLTCAM. During the authentication process, a user reference pattern is provided by the crypto-processor to the state machine 600. The state machine 600 can compare this pattern with the pattern stored in the arrays 630, 640, and send a message back in the event of a match. The state machine can perform additional tasks to enhance security, including, but not limited to, blocking repetitive negative authentications, inserting additional "dummy" patterns above and beyond the input pattern to be sure that parallel unwelcomed attacks are not occurring, and blocking input patterns that have excessive number of "no care" (BX) states. The "no cares" (BX) will match with any stored patterns, so the state machine can limit how many "no care" (BX) states are allowed, and block the authentication process when excessive numbers of (BX) states are involved.

In another example, the state machine 600 tracks the asymmetry between the "no care" state (BX) and the "blocking" state (BB). When the "blocking" state (BB) is downloaded in the BLCAM/BLTCAM, only a "no care" state (BX) can result in a match during authentication. Accordingly, the state machine 600 can convert the "blocking" state (BB) into a "no care" state (BX) during the authentication process following the second exemplary version (v2) of the BLCAM truth table shown in FIG. 2B. On the other hand, the state machine 600 can follow first exemplary version (v1) of the BLCAM truth table shown in FIG. 2A, and store "no care" states (BX) instead of "blocking" states (BB). The authentication process will then handle "0" states, "1" states and "blocking" states (BB). It should also be noted that the definition of the "blocking" state (BB) and the "no care" state (BX) at the flash level is the opposite in the stored stage versus the input stage. These definitions are arbitrary, and can be reversed.

Further, the state machine 600 can perform basic NAND flash functionality. Considering that BLCAM/BLTCAMs are based on NAND flash, the state machine can manage part of the arrays 630, 640 as a regular NAND and/or NOR flash, while reserving a portion of the arrays 630, 640 for BLCAM/BLTCAM type usage. Considering the prominent legacy of existing flash memory technology systems, this will allow the reuse of existing solutions in addition to the solutions provided by a BLCAM/BLTCAM.

Additionally, the state machine 600 is capable of storage of four states & traditional read. The state machine can also support a mode where the BLCAM/BLTCAM stores "0"s, "1"s, "BX", and "BB" cycles during the personalization cycle, but works as a traditional memory to simply read the content of the BLCAM/BLTCAM instead of using a matching cycle. The authentication cycle will then be performed in a way that is similar to a regular flash memory. This method is less secure because a crypto-analyst might find a way to extract the stored pattern during a read cycle. However, this method will be compatible with legacy software and architectures. Commonly used crypto-analysis methods to extract the content during a read cycle include Differential Power Analysis (DPA) and electromagnetic interference (EMI) detection.

A single chip can be designed to have a state machine 600 that can control an integrated flash array 640 in addition to a BLCAM/BLTCAM. The BLCAM/BLTCAM is back-compatible with an existing CAM. The truth table is exactly identical when zeros and ones area involved, as the logic describing the product is an exclusive OR, also referred to as XOR. Additionally, the BLTCAM is back-compatible with an existing TCAM. The truth table is identical when zeros, ones, and no cares are involved. The no care states create a yes in the step of matching yes or no when inserted in the input stage or the storage state of the TCAM.

The BLCAM/BLTCAM architecture described herein includes several advantages compared to traditional CAM (BCAM and TCAM) architectures. The BLCAM/BLTCAMs are simpler and cheaper to manufacture than the NAND CAMs based on only two NAND Flash-type transistor per cell. In addition, the size of the elementary BLCAM/BLTCAM cell is only twice as large as the cell size of NAND Flash-type. For example, the BLCAM/BLTCAM will be 8F2 if 4F2 is the cell size of the NAND flash technology that has been selected to design the BLCAM/BLTCAM, where F is the dimension of the technology node of the semiconductor process technology. This is smaller than a NAND TCAM, and requires no changes in the flash technology to design the new product. Small cell size means that the BLCAM/BLTCAM will be small, and that many parts can be produced out of a silicon wafer, keeping the cost low. When implemented with EEPROM, the cell size of the BLCAM/BLTCAM will be equal to two EEPROM cells.

Additionally, the BLCAM/BLTCAMs enhance the level of security during authentication. Unlike traditional Flash or EEPROM-based secure chip processors, also referred to as secure elements, smartcards, or secure storage, that usually expose the internally stored reference pattern during the authentication process, BLCAM/BLTCAM can be set to never read what is stored in memory. Most of the time, a BLCAM/BLTCAM is operating as a CAM, where the processing element simply compares at once the entire user pattern with the stored reference pattern in one machine cycle and determines if the two patterns match or not, resulting in a "yes" when the patterns match, and a "no" when they do not. In case of a mismatch, the BLCAM/BLTCAM does not disclose any information other than the fact that the pattern that has been provided by the user during authentication is not compatible with the reference pattern stored. A BLCAM/BLTCAM has blocking states that can be used to intentionally confuse the matching process and to confuse the cryptanalyst. Hackers that master crypto-analysis methods, including, but not limited to, differential power analysis (DPA) to extract the stored pattern of traditional secure chip processors during authentication cycle will have a harder time learning from a BLCAM/BLTCAM.

An additional advantage of the BLCAM/BLTCAM architecture is that BLCAM/BLTCAMs for applications, including, but not limited to, secure elements, smartcards, payment cards, access cards, or smart passports, are as convenient to use as flash or EEPROM based systems for the general public. During the personalization process, usually done by the service provider, the integrated patterns or MACs are loaded into the BLCAM/BLTCAM secure element in a similar way as existing secure elements. Accordingly, users simply enter their identification codes as required by existing systems to successfully authenticate themselves, and gain access to the service.

Further, BLCAM/BLTCAMs include back compatibility and thus have an expanded usage. Since the BLCAM/BLTCAM technology is based on traditional flash technology, it is possible to create a chip with a portion of the chip being a flash memory. The BLCAM/BLTCAM can be implemented for applications other than chip security applications.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A memory circuit comprising:
   a memory cell comprising
      a first non-volatile transistor comprising a first control gate connected to a first bit line, and
      a second non-volatile transistor comprising a second control gate connected to a second bit line,
      wherein a transistor state of each of the first non-volatile transistor and the second non-volatile transistor is configured to be programmed in a first transistor state or a second transistor state, and
      wherein the first non-volatile transistor is connected in series with the second non-volatile transistor;
   wherein the input state of the memory cell is defined by a first bit on the first bit line and a second bit on the second bit line and is configured to be a plurality of states comprising an input zero state, an input one state, an input no care state, and an input blocking state,
   wherein the stored state of the memory cell is defined by the transistor states of the first non-volatile transistor and the second non-volatile transistor and is configured to be a plurality of states comprising a stored zero state, a stored one state, a stored no care state, and a stored blocking state,
   wherein when the input state of the memory cell is the input blocking state, the memory cell is configured to be in a blocking mode unless the stored state of the memory cell is the stored no care state, and
   wherein when the stored state of the memory cell is the stored blocking state, the memory cell is configured to be in the blocking mode unless the input state of the memory cell is the input no care state.

2. The memory circuit of claim 1, wherein
   the first non-volatile transistor further comprises a first source terminal, and a first drain terminal, and
   the second non-volatile transistor further comprises a second source terminal, and a second drain terminal, and
   wherein the first source terminal is connected in series with the second drain terminal.

3. The memory circuit of claim 1, wherein the blocking mode provides high impedance across the memory cell such that the memory cell is not conductive.

4. The memory circuit of claim 1, wherein the memory cell is a content addressable memory (CAM) cell.

5. The memory circuit of claim 1, wherein the first non-volatile transistor and the second non-volatile transistor are NAND Flash-type transistors.

6. A memory circuit comprising:
   a memory cell comprising
      a first non-volatile transistor comprising a first control gate connected to a first bit line, and
      a second non-volatile transistor comprising a second control gate connected to a second bit line,
      wherein a transistor state of each of the first non-volatile transistor and the second non-volatile transistor is configured to be programmed in a first transistor state or a second transistor state, and
      wherein the first non-volatile transistor is connected in series with the second non-volatile transistor;
   wherein the input state of the memory cell is defined by a first bit on the first bit line and a second bit on the second bit line and is configured to be a plurality of states comprising an input zero state, an input one state, and an input blocking state,
   wherein the stored state of the memory cell is defined by the transistor states of the first non-volatile transistor and the second non-volatile transistor and is configured to be a plurality of states comprising a stored zero state, a stored one state, and a stored no care state, and
   wherein when the input state of the memory cell is the input blocking state, the memory cell is configured to be in a blocking mode unless the stored state of the memory cell is a stored no care state.

7. The memory circuit of claim 6, wherein:
   wherein the plurality of states of the input state of the memory cell further comprises an input no care state,
   wherein the plurality of states of the stored state of the memory cell further comprises a stored blocking state, and
   wherein when the stored state of the memory cell is the stored blocking state, the memory cell is configured to be in the blocking mode unless the input state of the memory cell is the input no care state.

8. The memory circuit of claim 6, wherein
   the first non-volatile transistor further comprises a first source terminal, and a first drain terminal, and the second non-volatile transistor further comprises a second source terminal, and a second drain terminal, and wherein the first source terminal is connected in series with the second drain terminal.

9. The memory circuit of claim 6, wherein the blocking mode provides high impedance across the memory cell such that the memory cell is not conductive.

10. The memory circuit of claim 6, wherein the memory cell is a content addressable memory (CAM) cell.

11. The memory circuit of claim 6, wherein the first non-volatile transistor and the second non-volatile transistor are NAND Flash-type transistors.

12. A memory circuit comprising:
a memory cell comprising
  a first non-volatile transistor comprising a first control gate connected to a first bit line, and
  a second non-volatile transistor comprising a second control gate connected to a second bit line,
  wherein a transistor state of each of the first non-volatile transistor and the second non-volatile transistor is configured to be programmed in a first transistor state or a second transistor state, and
  wherein the first non-volatile transistor is connected in series with the second non-volatile transistor;
wherein the input state of the memory cell is defined by a first bit on the first bit line and a second bit on the second bit line and is configured to be a plurality of states comprising an input zero state, and input one state, and an input no care state,
wherein the stored state of the memory cell is defined by the transistor states of the first non-volatile transistor and the second non-volatile transistor and is configured to be a plurality of states comprising a stored zero state, a stored one state, and a stored blocking state, and wherein when the stored state of the memory cell is a stored blocking state, the memory cell is configured to be in a blocking mode unless the input state of the memory cell is the input no care state.

13. The memory circuit of claim 12, wherein:
wherein the plurality of states of the input state of the memory cell further comprises an input blocking state,
wherein the plurality of states of the stored state of the memory cell further comprises a stored no care state, and
wherein when the input state of the memory cell is the input blocking state, the memory cell is configured to be in the blocking mode unless the stored state of the memory cell is the stored no care state.

14. The memory circuit of claim 12, wherein
the first non-volatile transistor further comprises a first source terminal, and a first drain terminal, and
the second non-volatile transistor further comprises a second source terminal, and a second drain terminal, and wherein the first source terminal is connected in series with the second drain terminal.

15. The memory circuit of claim 12, wherein the blocking mode provides high impedance across the memory cell such that the memory cell is not conductive.

16. The memory circuit of claim 12, wherein the memory cell is a content addressable memory (CAM) cell.

17. The memory circuit of claim 12, wherein the first non-volatile transistor and the second non-volatile transistor are NAND Flash-type transistors.

* * * * *